(12) United States Patent
Fellingham et al.

(10) Patent No.: US 7,472,983 B2
(45) Date of Patent: Jan. 6, 2009

(54) INTELLIGENT PRINT MASK

(75) Inventors: Peter J. Fellingham, San Diego, CA (US); Brian Horton, San Diego, CA (US)

(73) Assignee: Eastman Kodak Company, Rochester, NY (US)

(*) Notice: Subject to any disclaimer, the term of this patent is extended or adjusted under 35 U.S.C. 154(b) by 401 days.

(21) Appl. No.: 11/029,071

(22) Filed: Jan. 4, 2005

(65) Prior Publication Data

US 2006/0146090 A1   Jul. 6, 2006

(51) Int. Cl.
*B41J 2/21*   (2006.01)

(52) U.S. Cl. .................... 347/43; 347/15; 347/41

(58) Field of Classification Search ........... 347/9, 347/12, 37, 40, 42–43, 15, 41
See application file for complete search history.

(56) References Cited

U.S. PATENT DOCUMENTS 6,491,374 B1   12/2002   Bauer et al.
6,547,354 B1 *  4/2003   Askeland et al. ............ 347/12

* cited by examiner

*Primary Examiner*—Lam S Nguyen
(74) *Attorney, Agent, or Firm*—Buskop Law Group, PC

(57) ABSTRACT

A multi swath printing method for printing an image on an ink jet printing system is used to reduce image banding. The ink jet printing system includes a printhead with one or more ink ejection nozzles. The method entails forming a set of individual print masks. Each individual print mask has one or more groupings of two dimensional patterns of different frequencies and is assigned to a color of the ink jet printing system. The method ends by inputting the set of individual print masks formed into the ink jet printing system to form an input mask set and printing images using the input mask set to create an out-of-phase composite of the image printed. Banding is substantially reduced in the printed image and the printed image comprises a resolution between 300 dpi and 4800 dpi.

11 Claims, 5 Drawing Sheets

ASSYMETRICAL SWATH
MASK BIT MAP

FIG. 3A

ASSYMETRICAL SWATH
MASK BINARY FILTER

INTELLIGENT PRINT MASK

FIELD OF THE INVENTION

The present embodiments relate generally to inkjet printing. The present embodiments relate specifically to multi swath printing methods for printing an image using an ink jet printing system to reduce image banding.

BACKGROUND OF THE INVENTION

Raster Image Processors (RIPs) are utilized to determine which pixels will be used to render a given printed image. Multi-pass inkjet printing re-creates such an image on the medium as it is incremented progressively under the print heads after each successive print swath until all pixels are addressed to complete the print. Interleaf print masking is used to determine which printhead nozzles will be used to address each pixel location for a given print mode. Each raster line is typically printed such that successive pixel locations in the carriage scan axis may be addressed by a number of nozzles spaced vertically apart, thus softening the effect of any nozzle jetting anomalies. The number of nozzles used in each rasterline is typically proportional to the number of print passes set by the print mode. The number of swaths required to print a completed image is generally equal to the number of passes in the print mode.

The use of one phase-locked leaf mask tends to result in different color ink drops landing on each other at each pixel location addressed in a given printed image. Further, during bi-directional printing, the order that different color dots are laid down would alternate on each print swath for printheads mounted side by side. For instance, in 3-pass printing the first and third swath would consist of magenta over yellow dots, while the second swath would consist of yellow over magenta dots. This tends to produce obvious hue shift banding in three-pass mode at the media feed increment because images are printed using two right to left swaths for each left to right swath.

Apart from the color differences that result from the ink drop color lay-down order, there is a strong tendency for dots laid down in contact with each other to coalesce or flow together, especially during high speed printing. This coalescence can change the apparent density, color and texture of image areas and generally is not a desirable ink interaction. For a given ink and media combination and print mode, coalescence depends on factors that include image saturation, ambient temperature and humidity, color calibration, and ink drop jetting directionality and velocity variations. This means that coalescence tends to be uncontrolled and can be exaggerated by small factors.

In practice images are stochastically screened to improve smoothness by introducing some dot placement randomization. This reduces the number of different color dots deliberately fired to the same pixel location in image areas with lower color saturation, but this becomes less effective as total saturation rises where a higher proportion of primary color dots share pixel locations. When conventional leaf masking is used, this tends to exaggerate coalescence and hue shift banding in areas of high saturation.

The present invention meets these needs by improving print quality at high speed, saving time and energy.

SUMMARY OF THE INVENTION

Embodied herein is a multi pass or multi swath printing method for printing an image on an ink jet printing system to reduce image banding. The ink jet printing system includes a printhead with one or more ink ejection nozzles. The method entails forming a set of individual print masks. Each individual print mask has one or more groupings of two dimensional patterns of different frequencies and is assigned to a color of the ink jet printing system. The method ends by inputting the set of individual print masks formed into the ink jet printing system to form an input mask set and printing images using the input mask set to create an out-of-phase multi-color composite of the image printed. Banding is substantially reduced in the printed image and the printed image comprises a resolution between 300 dpi and 4800 dpi.

The present embodiments are advantageous over the prior art because the methods provide robustness against banding caused by a variety of factors.

BRIEF DESCRIPTION OF THE DRAWINGS

In the detailed description of the preferred embodiments presented below, reference is made to the accompanying drawings, in which:

FIG. 3a shows an asymmetrical swath mask as a bit map.

FIG. 3b shows an asymmetrical swath mask as a binary filter which can be formed by the present embodiments.

FIG. 4a is a binary representation of FIG. 1 depicting a binary filter for light cyan.

FIG. 4b is a binary representation of FIG. 1 depicting a binary filter for black.

FIG. 4c is a binary representation of FIG. 1 depicting a binary filter for cyan.

FIG. 4d is a binary representation of FIG. 1 depicting a binary filter for light magenta.

FIG. 4e is a binary representation of FIG. 1 depicting a binary filter for yellow.

FIG. 4f is a binary representation of FIG. 1 depicting a binary filter for magenta.

Figure 1:
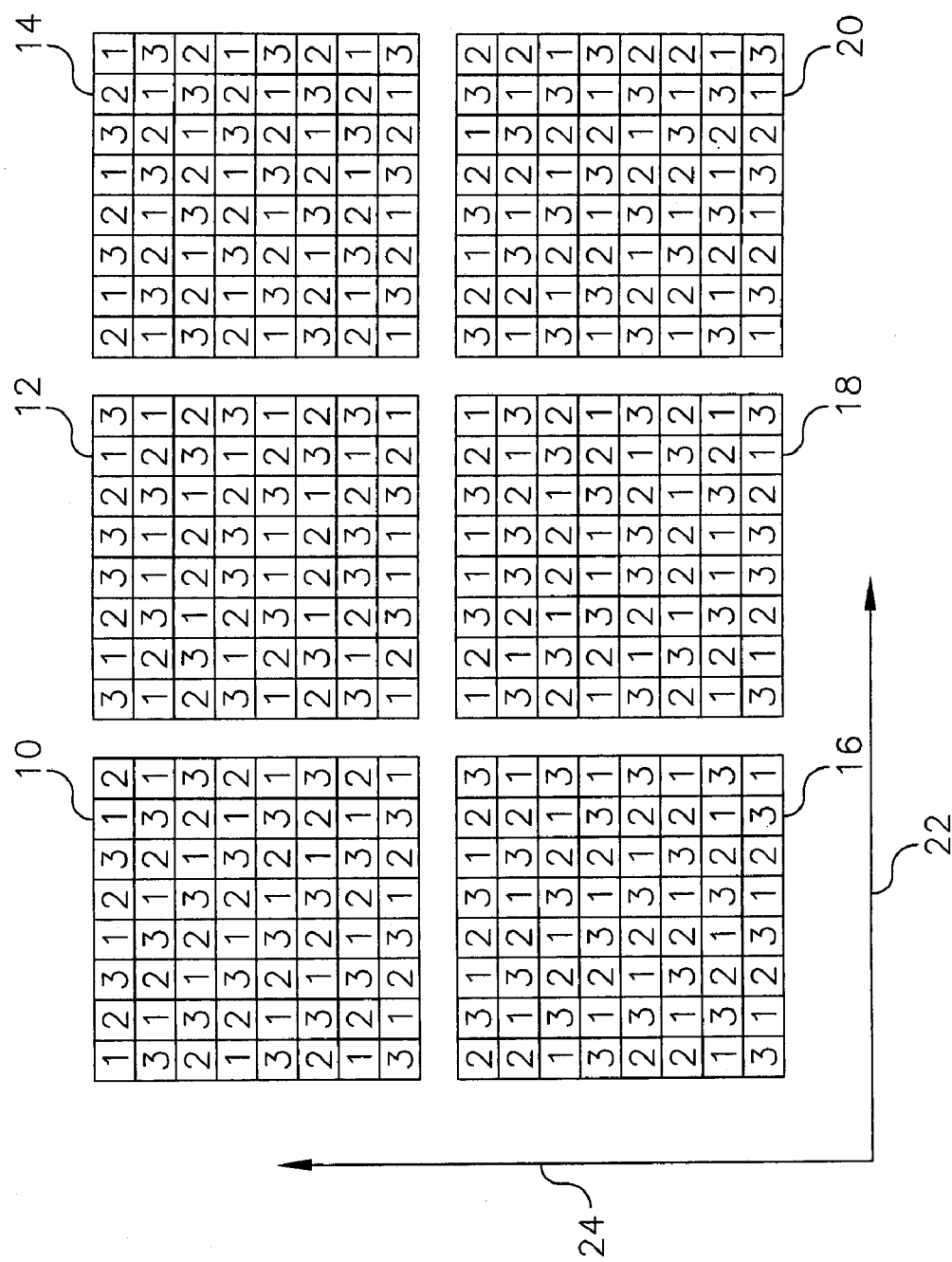
FIG. 1 depicts six individual print masks.

The present embodiments are detailed below with reference to the listed Figures.

DETAILED DESCRIPTION OF THE INVENTION

Before explaining the present embodiments in detail, it is to be understood that the embodiments are not limited to the particular descriptions and that it can be practiced or carried out in various ways.

The present embodiments relate to methods for image quality improvement, especially for three-pass ink jet printing. The present embodiments use different individual print masks, which can be termed "leaf masks" for each color plane or layer of an image to enable better image quality at higher printer throughput. The individual print masks are each assigned to an individual printhead of the printing system.

If the same individual print mask is used for each color plane, or if the leaf masks are phase locked in phase to each other, the relative motion between the position of the different color dots tends to drive moiré patterns and banding. The moiré patterns and banding occur because the same shift between color dots is seen at each pixel boundary, thereby amplifying the combined effect of dot misplacement errors.

The present embodiments address the need to reduce moiré patterns and banding. Accordingly, the present embodiments have leaf masks with patterns that are locked out of phase with each other.

The present embodiment ensures that the dot lay down order for each pixel location is disconnected from the carriage scan direction along the X-axis of the printing system to eliminate hue shift banding based on the order of dot lay down while printing at least two different colors in the same swath.

An advantage of the embodied methods is that they minimize color shifts if the color planes are out of perfect alignment due to errors in the position of the installed printheads.

Still another benefit of the embodied methods is that they reduce banding if the color plane alignment drifts dynamically due to fluctuations in carriage speed, ink drop velocity or media feed accuracy.

Additionally, an advantage of the embodied methods is that they control and minimize coalescence during higher speed printing.

More specifically, the present embodiments relate to a novel leaf masking technology that utilizes different leaf masks for each color. Using different leaf masks allows the order of different color dots to be laid down to be varied pixel by pixel, rather than be locked to carriage direction on a swath by swath basis.

Some of the described methods herein have embodiments that utilize a stepped swath. These stepped swaths are different from ramped swaths known in the prior art and are stated in U.S. Pat. No. 6,491,374, hereby incorporated by reference.

Three-pass printing with dilute inks are benefited by masks that lay down half of the ink in the middle third of the swath, thereby balancing out the number of dots addressed printing right to left and left to right. The balance is especially useful when ink drop satellites show a significant bias in density left to right.

Different color printheads that share the same swath produce improved image quality by biasing the ink load of each color to a different region of the swath. For example, with cyan, black and light cyan sharing one swath, the light cyan mask can have the center of the swath do more work, while the cyan and black can lay down more ink in the trailing third of the swath. The advantage is that the center of the swath is not over saturated while gaining the advantages of reduced banding.

Duplicating a low percentage of dots fired to some pixel locations in an image helps to even out density and "bridge" successive swaths, thereby reducing banding.

In these methods, leaf masks are formed to use more than one nozzle to address specific pixel locations. These methods are especially useful when the total number of extra dots in the swath is in the range of three percent to twenty percent, with a preferred range of three to ten percent.

The embodied methods provide the benefit of injecting noise into the printed image. Injecting noise increases error diffusion and reduces banding in the image. Depending on the color ink jetted and the underlying mask pattern, the location of the extra dots typically favors the leading, middle or trailing portions of the swath.

The present embodiments provide benefits that relate to improved print speed, reduction of moiré patterns, and ability to use a three-swath or three-pass print process.

The embodied methods provide the advantage of the ability to print at a higher speed, thereby saving time and labor costs in producing printed media products.

The present embodiments save energy with higher printing speed, in that, the printing jobs are completed in less time and the machines can then be turned off. For example, ten prints can be printed in half the time using this improved method.

Use of the novel methods reduces the need to service the printers because the same output is produced in half the time and less movement is required by the printhead scan mechanism. The reduction in movement equates to less wear and tear on the mechanism for the same amount of prints produced.

Embodied herein are multi swath printing methods for printing an image using an ink jet printing system to reduce image banding, wherein the ink jet printing system comprises at least one printhead with at least one ink ejection nozzle having a scan axis The methods entail forming a set of individual print masks. Each individual print mask comprises an x-axis, a y-axis, and one or more groupings of two dimensional patterns of different frequencies. Each individual print mask is assigned to a color of the ink jet printing system. The methods continue by inputting the set of individual print masks formed into the ink jet printing system to form an input mask set; and printing images using the input mask set to create an out-of-phase composite of the image printed. The banding in the printed image is substantially reduced and the printed image comprises a resolution between 300 dpi and 4800 dpi.

With reference to the figures, FIG. 1 depicts a representation of six individual print or "leaf" masks. The individual print mask 10, as depicted in FIG. 1, is 100% bit map for a three-pass print mode. In the depiction, the print mask is assigned to light cyan and has an 8×8 pixel bit map with 64 pixel addresses. FIG. 1 represents a first portion 1 of the swath in which a particular pixel occurs, a second portion 2 of the swath where a pixel occurs, and a third portion 3 of the swath for a particular pixel.

Also in FIG. 1, the individual print mask 12 is a bit map that accomplishes the same things as for the light cyan described above, but defines the pixel addresses by swath for black. The individual print mask 14 is a bit map that defines the pixel addresses for cyan the same elements as the individual print mask for light cyan. The individual print mask 16 is for light magenta. The individual print mask 18 is for yellow and the individual print mask 20 is for magenta.

In the most preferred embodiment, each individual print mask has an x axis 22 and y axis 24. The individual print masks are binary filters that instruct individual nozzles of the ink jet printing system to address a pixel that occurs in an image file in a defined sequence of firing. The preferred embodiment has the individual print masks comprised of one or more groupings of two-dimensional patterns of different frequencies.

Figure 2:
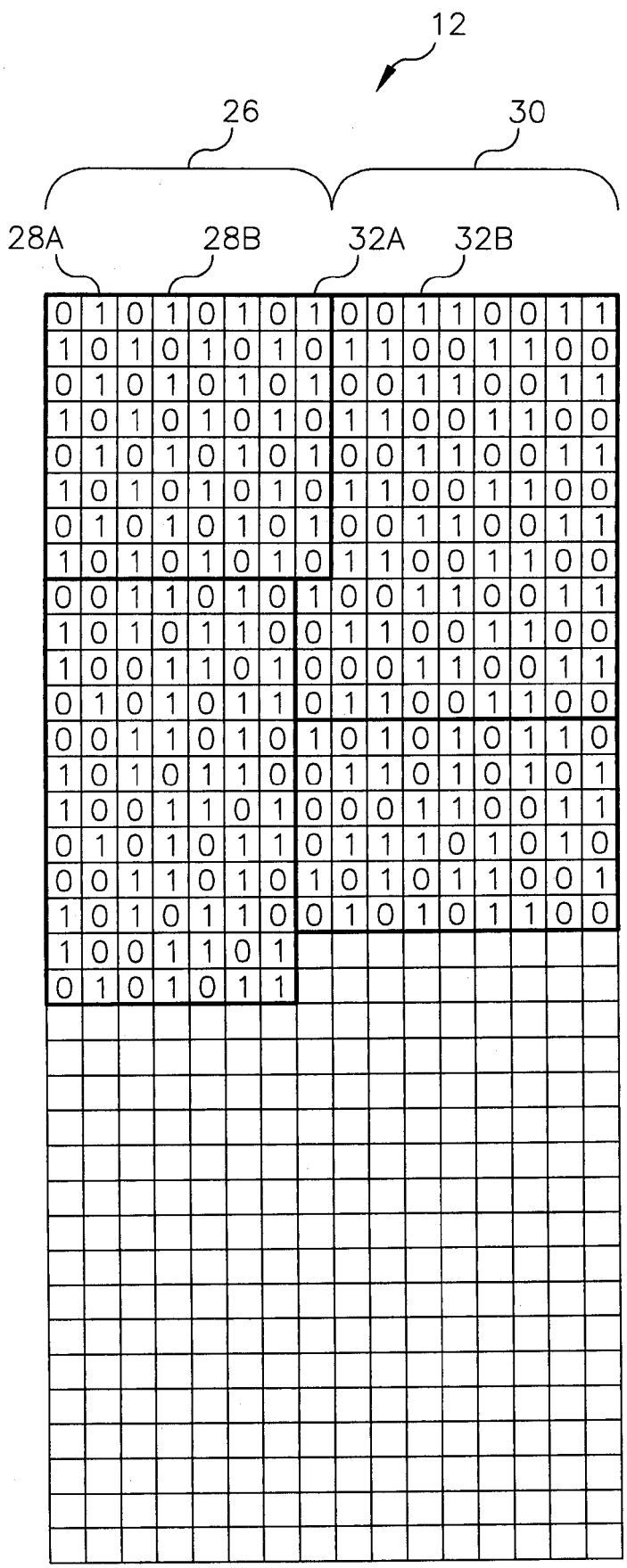
FIG. 2 depicts a two dimensional patterns of a first frequency and a two dimensional patterns of a second frequency used in an individual print mask.

FIG. 2 shows a particular individual print mask 12 with various groupings of two-dimensional patterns of different frequencies.

A first grouping of two dimensional patterns 26 relates to one area with a particular frequency in that area. FIG. 2 represents dots 28a and 28b and the spacing between the dots defines the particular frequency.

A second grouping of two dimensional patterns 30 relates to one area with a second particular frequency in that area. FIG. 2 represents a group of dots 32a and 32b with each dot group having the same frequency and a second particular frequency is the spacing between the groups. FIG. 2 is a simple representation of this principal recognizing that more complex patterns may be used with the method.

While FIG. 1 shows an 8×8 pixel bit map, the height and width are not limited. Typically, the number of swaths or passes defined by the print mode multiplied by the mask bit map height is equal to the number of nozzles used to print with that mask. For the bit maps shown in FIG. 1, the number of nozzles used is twenty-four. Typical masks can be wider than eight pixels in the X-axis 22 to allow more flexibility in pattern design. For example, the widths of other usable masks can be 32 pixels, 64 pixels, 128 or more pixels wide.

Figures 4A, 4B, 4C:
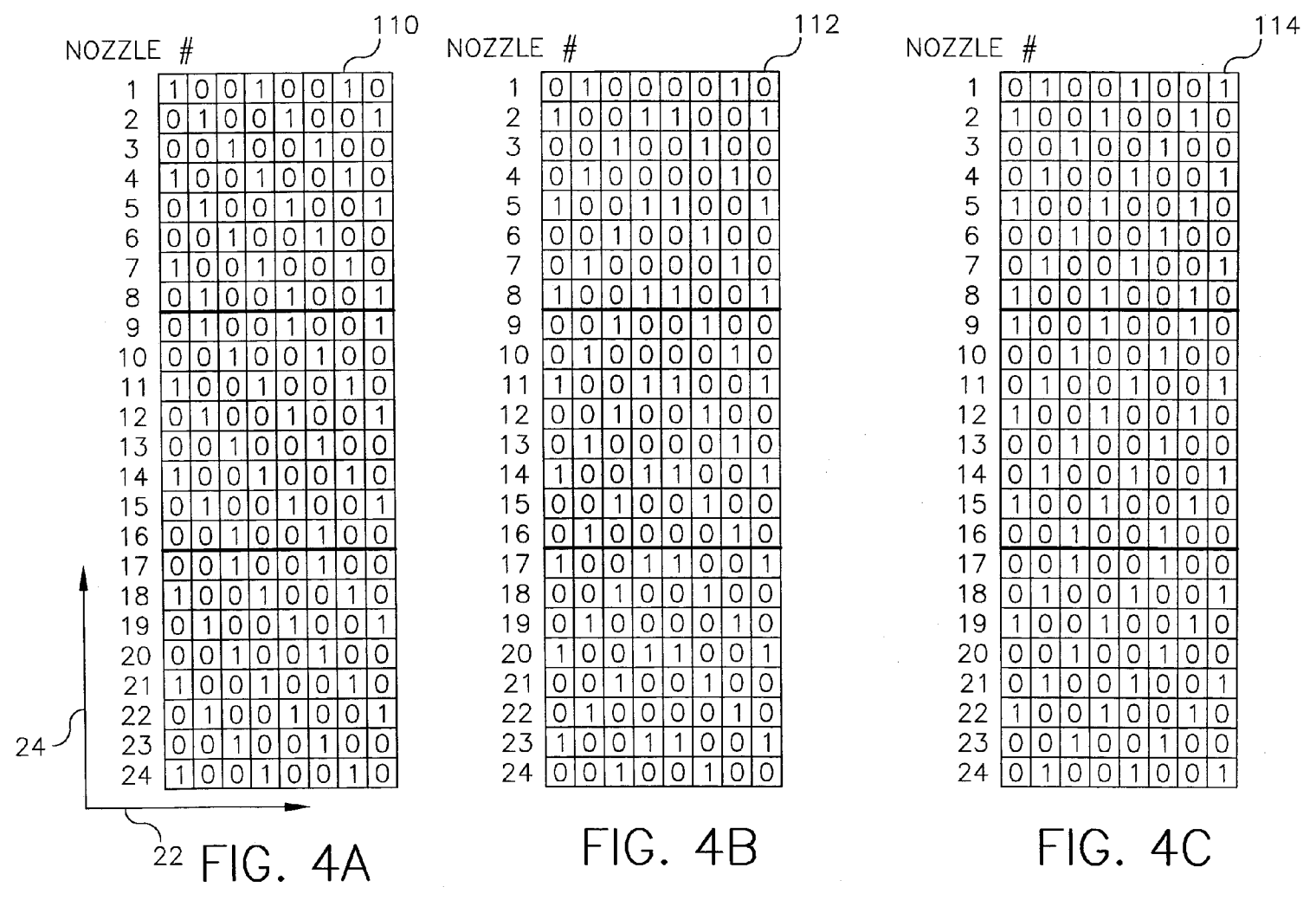
Figures 4D, 4E, 4F:
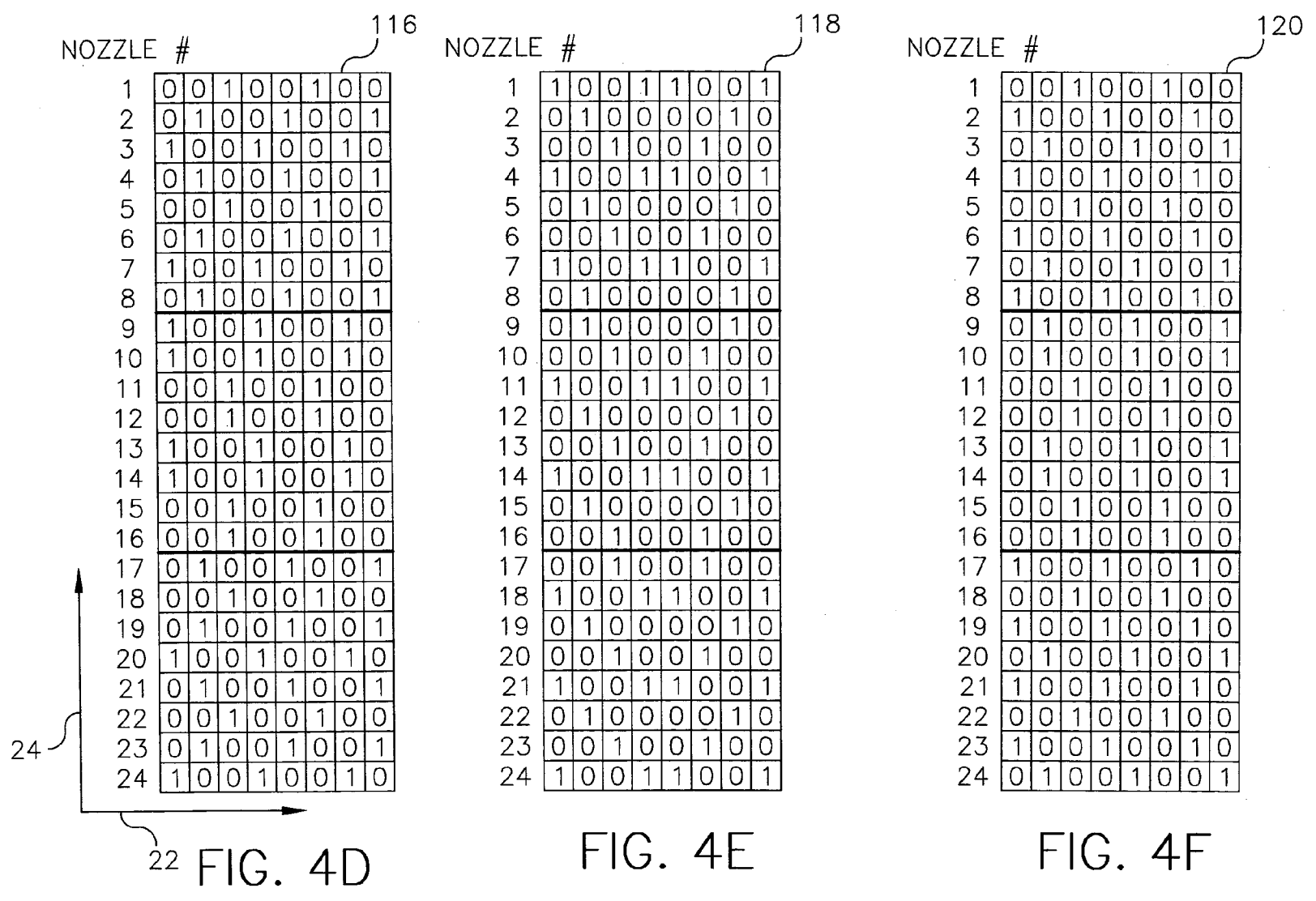

FIGS. 4a through 4f show the binary representation of the mask bit maps shown in FIG. 1. The binary filter for each of the twenty-four nozzles is shown. The sequence is read left to right when the printing is left to right, and the sequence is read right to left when the printing is done right to left. FIG. 4a depicts a binary filter 110 for light cyan; FIG. 4b depicts a binary filter 112 for black; FIG. 4c depicts a binary filter 114 for cyan; FIG. 4d depicts a binary filter 116 for light magenta; FIG. 4e depicts a binary filter 118 for yellow; and FIG. 4f depicts a binary filter 120 for magenta.

Once eight consecutive pixels have been filtered in the x axis 22 for each nozzle, and in the y axis 24 for each nozzle, the eight pixel wide mask is re-used in a continuous loop. This can be applied right to left or left to right.

In a preferred embodiment, each individual print mask is assigned to a color of the ink jet printing system, such as black, cyan, light cyan, magenta, or light magenta. Other colors, such as red, green and blue, can be used. Fewer than six colors can be used in this method. Six colors and six masks are the embodiment shown. The most preferred embodiment contemplates that each color has its own mask. More than six colors and more than six masks can be used. Additional colors can be added other than those listed above.

In the next step of the method, the formed set of individual print masks is transmitted to the ink jet printing system to form an input mask set. Typically, the individual print masks are embedded in the firmware of the printing system prior to providing the printing system to a customer. Alternatively, the individual print masks can be transmitted from a remote site to the firmware. The transmission can be wireless or through a printer connection.

Next, images are printed using the input mask set to create an out-of-phase composite of the printed image. The printed image includes an image resolution between 300 dpi and 4800 dpi with banding that has been substantially reduced.

Alternatively, the formed set of individual print masks can be locked out-of-phase from every other individual print mask and an image can be printed. The locking out of phase is by design of the individual print masks one relative to the other.

The reduced banding can be reduced moiré interference banding, reduced overfeed banding, reduced underfeed banding, reduced hue shift banding, or other types of banding such as coalescence banding.

In an alternative embodiment, two or more two dimensional patterns can be used to achieve an asymmetrical density profile 38a, 38b, and 38c across the print head scan axis as shown in FIGS. 3a and 3b. FIG. 3a shows an asymmetrical swath mask as a bit map. FIG. 3b shows an asymmetrical swath as a binary filter which can be formed by the invention.

The embodied methods for a printing system utilize inks and dyes, such as synthetic inks, pigment inks, aqueous inks, solvent based inks, gloss enhancing fluids, and combinations thereof.

The embodied methods contemplate an additional step of assigning a print mask to a print mode based on a user selection. A print mode can use two swaths to address all image pixels, three swaths or additional swaths. Generally between two swaths and twenty swaths are usable to print the image.

The print modes can be unidirectional or a bidirectional. Bidirectional means printing ink initially in a first direction along the printhead scan or x-axis 22 and then reversing the direction to a second direction opposite of the first direction.

The invention has been described in detail with particular reference to certain preferred embodiments thereof, but it will be understood that variations and modifications can be effected within the spirit and scope of the invention.

PARTS LIST 1. first portion of the swath
2. second portion of the swath
3. third portion of the swath
10. individual print mask
12. individual print mask
14. individual print mask
16. individual print mask
18. individual print mask
20. individual print mask
22. x axis
24. y axis
26. first grouping of two dimensional patterns
28a. dot
28b. dot
30. second grouping of two dimensional patterns
32a. dot
32b. dot
38a. asymmetrical density profile
38b. asymmetrical density profile
38c. asymmetrical density profile
110. binary filter
112. binary filter
114. binary filter
116. binary filter
118. binary filter
120. binary filter

The invention claimed is:

1. A multi swath printing method for printing an image using an ink jet printing system to reduce image banding, wherein the ink jet printing system comprises at least one printhead with at least one ink ejection nozzle having a scan axis, wherein the method comprises the steps of:
   a. providing a plurality of individual print masks, wherein each individual print mask of the plurality of individual print masks comprises a x-axis, a y-axis, and at least one grouping of two dimensional patterns of different frequencies, wherein the at least one grouping of two dimensional patterns in a first print mask of the plurality of individual print masks is configured to achieve an asymmetrical density profile across the scan axis and wherein the individual print masks are configured to be out-of-phase from one another;
   b. combining the plurality of individual print masks to form an input mask set wherein each individual print mask of the input mask set is assigned to a color of the ink jet printing system;
   c. printing images using the input mask set.

2. The method of claim 1, wherein the individual print masks are binary filters.

3. The method of claim 1, wherein the color is selected from the group consisting of light cyan, cyan, light magenta, magenta, yellow, black, and combinations thereof.

4. The method of claim 1, wherein the ink is selected from the group consisting of a dye-based ink, a synthetic ink, a pigmented ink an aqueous ink, a solvent based ink, a gloss enhancing fluid, and combinations.

5. The method of claim 1, further comprising the step of assigning a print mask to each individual print mode.

6. The method of claim 5, wherein the print mode uses between two and twenty swaths to print the image.

7. The method of claim 5, wherein at least one print mode is a bidirectional print mode.

8. An image created by the method of claim 1, wherein the image created has reduced image banding.

9. The method of claim 1 wherein:
the different frequencies further comprise a second distance between groups of pixels of each individual print mask.

10. The method of claim 1 wherein:
a portion of the pixels formed on the print media by the method are addressed more than once by the printhead.

11. The method of claim 1 wherein:
each individual print mask formed is locked out-of-phase from every other individual print mask formed.

* * * * *